(12) United States Patent
Sabeur et al.

(10) Patent No.: US 12,192,251 B2
(45) Date of Patent: **\*Jan. 7, 2025**

(54) PROXY-CALL SESSION CONTROL FUNCTION (P-CSCF)

(71) Applicant: T-Mobile USA, Inc., Bellevue, WA (US)

(72) Inventors: Nassereddine Sabeur, Bellevue, WA (US); Saqib Badar, Bellevue, WA (US); Shujaur Mufti, Snoqualmie, WA (US); Joel Arends, Renton, WA (US); Subramania Kaushik, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/500,845

(22) Filed: Oct. 13, 2021

(65) Prior Publication Data
US 2023/0115970 A1    Apr. 13, 2023

(51) Int. Cl.
*H04L 65/1069*    (2022.01)
*H04L 41/0654*    (2022.01)
*H04L 65/1073*    (2022.01)

(52) U.S. Cl.
CPC ...... *H04L 65/1069* (2013.01); *H04L 41/0654* (2013.01); *H04L 65/1073* (2013.01)

(58) Field of Classification Search
CPC ............. H04L 65/1069; H04L 41/0654; H04L 65/1073

(Continued)

(56) References Cited

U.S. PATENT DOCUMENTS 8,018,858 B2  9/2011  Lim
8,442,526 B1  5/2013  Bertz
(Continued)

FOREIGN PATENT DOCUMENTS

WO    2014053162 A1    4/2014
WO    2015078528 A1    6/2015
(Continued)

OTHER PUBLICATIONS

International Search Report and Written Opinion, by the ISA/KR, mailed Nov. 14, 2022, in PCT Application No. PCT/US2022/074433 (7 pages).

(Continued)

*Primary Examiner* — Meng Vang
(74) *Attorney, Agent, or Firm* — Foley IP Law, PLLC (57) ABSTRACT

Solutions for providing a data traffic session with proxy-call session control function (P-CSCF) restoration include: receiving an indication, by an application server (AS), that a user equipment (UE) is registered with a first proxy node; receiving, at a subscriber information node, from a call session control function (e.g., over an N70 interface), a first message triggering proxy node restoration; based on at least receiving the first message triggering proxy node restoration, transmitting, by the subscriber information node, to a management node, a second message triggering proxy node restoration; receiving an indication, by the AS, that the UE is registered with a second proxy node different than the first proxy node; and based on at least receiving a session initiation message, establishing the data traffic session for the UE with the second proxy node.

19 Claims, 6 Drawing Sheets

(58) Field of Classification Search
USPC .................................................... 709/227
See application file for complete search history.

(56) References Cited

U.S. PATENT DOCUMENTS

| | | | |
|---|---|---|---|
| 8,644,823 | B2 | 2/2014 | Rozinov |
| 8,934,461 | B2 | 1/2015 | Leis |
| 9,001,664 | B2 | 4/2015 | Sparks |
| 9,143,537 | B2 | 9/2015 | Mui |
| 9,288,276 | B2 | 3/2016 | Adamczyk |
| 9,398,473 | B2 | 7/2016 | Goerke |
| 9,426,833 | B2 | 8/2016 | Mufti |
| 9,578,068 | B2 | 2/2017 | Vazquez |
| 9,596,712 | B2 | 3/2017 | Hallenstal |
| 9,894,110 | B2 | 2/2018 | Li |
| 9,979,756 | B2 | 5/2018 | Nomani |
| 10,148,487 | B2 | 12/2018 | Kunz |
| 10,219,149 | B2 | 2/2019 | Kim |
| 10,284,420 | B2 | 5/2019 | Livanos |
| 10,326,604 | B2 | 6/2019 | Castro |
| 10,327,277 | B2 | 6/2019 | Kim |
| 10,523,720 | B2 | 12/2019 | Hallenstal |
| 10,812,534 | B2 | 10/2020 | Chong |
| 10,856,110 | B1 * | 12/2020 | Files .......................... G01S 5/04 |
| 10,939,345 | B2 | 3/2021 | Chong |
| 11,129,215 | B2 * | 9/2021 | Bharatia ................. H04L 67/56 |
| 11,178,714 | B2 | 11/2021 | Li |
| 11,218,519 | B2 | 1/2022 | Foti |
| 11,290,549 | B2 | 3/2022 | Krishan |
| 2012/0185613 | A1 | 7/2012 | Noldus |
| 2013/0010804 | A1 | 1/2013 | Alonso |
| 2015/0120947 | A1 | 4/2015 | Guo |
| 2015/0195864 | A1 * | 7/2015 | Bartolome ............ H04L 65/104 370/221 |
| 2016/0380802 | A1 | 12/2016 | Kunz |
| 2018/0213449 | A1 | 7/2018 | Kim |
| 2018/0241784 | A1 | 8/2018 | Hallenstal |
| 2019/0104044 | A1 | 4/2019 | Yang |
| 2019/0261449 | A1 * | 8/2019 | Kim ..................... H04L 65/1046 |
| 2019/0335534 | A1 * | 10/2019 | Atarius ............... H04L 65/1016 |
| 2020/0153874 | A1 * | 5/2020 | Christopher ........ H04L 65/1016 |
| 2020/0178336 | A1 | 6/2020 | Li |
| 2020/0195495 | A1 * | 6/2020 | Parker .................. H04L 9/3239 |
| 2020/0322785 | A1 * | 10/2020 | Jia ..................... H04W 72/1215 |
| 2021/0266349 | A1 | 8/2021 | Foti |
| 2021/0377896 | A1 | 12/2021 | Wei |
| 2022/0014948 | A1 * | 1/2022 | Smith ....................... G06N 3/08 |
| 2022/0232046 | A1 | 7/2022 | Agarwal |
| 2022/0232051 | A1 * | 7/2022 | Zhu .................... H04L 65/1073 |
| 2022/0247798 | A1 | 8/2022 | Guo |

FOREIGN PATENT DOCUMENTS

| | | | | |
|---|---|---|---|---|
| WO | 2020008292 | A1 | 1/2020 | |
| WO | 2020057764 | A1 | 3/2020 | |
| WO | 2020228471 | A1 | 11/2020 | |
| WO | WO-2021120744 | A1 * | 6/2021 | ......... H04L 65/1016 |
| WO | WO-2021158149 | A1 * | 8/2021 | ......... H04L 65/1016 |
| WO | 2022211686 | A1 | 10/2022 | |
| WO | 2023034671 | A1 | 3/2023 | |
| WO | 2023064701 | A1 | 4/2023 | |
| WO | 2023064716 | A1 | 4/2023 | |

OTHER PUBLICATIONS

International Search Report and Written Opinion, by the ISA/EP, mailed Dec. 19, 2022, in PCT Application No. PCT/US2022/077725 (11 pages).

International Search Report and Written Opinion, by the ISA/EP, mailed Dec. 19, 2022, in PCT Application No. PCT/US2022/077809 (8 pages).

3GPP; TSGCT; IMS Restoration Procedures; (Release 16), 3GPP TS 23.380 V16.4.0, Jun. 29, 2021 (57 pages).

Nokia et al., Correcting AMF behaviour for Service Request that is not integrity protected, S2-1903668, SA WG2 Meeting #132, Xi'an, PRC, Apr. 2, 2019 (376 pages).

Huawei et al., Support of PCRF-based P-CSCF restoration, C4-203107, 3GPP TSG-CT WG4 Meeting #98e, May 22, 2020 (4 pages).

Hewlett Packard Enterprise, Trigger P-CSCF Restoration Description and Callback URIs, C4-212525, 3GPP TSG-CT WG4 Meeting #103-e, Apr. 22, 2021 (8 pages).

Ericsson, "P-CSCF restoration in 5GS", vol. CT WG4, No. KunMing, P.R. China; Apr. 16, 2018-Apr. 20, 2018, Apr. 15, 2018 (Apr. 15, 2018), 3GPP Draft; C4-183182-DISC-P-CSCF-RESTORATION, 3rd Generation Partnership Project (3GPP), Mobiles Competence Centre; 650 Route Des Lucioles; F-06921 Sophia-Antipolis Cedex; France (4 pages).

ZTE, "Solution for P-CSCF Restoration", vol. Ct WG4, No. Krakow, Poland; Aug. 21, 2017-Aug. 25, 2017, Aug. 20, 2017 (Aug. 20, 2017), 3GPP Draft; C4-174152_P-CSCF Restoration, 3rd Generation Partnership Project (3GPP), Mobile Competence Centre; 650 Route Des Lucioles; F-06921 Sophia-Antipolis Cedex; France (2 pages).

3GPP TS 23.228 version 16.5.0 Release 16 (Oct. 2020) (Year 2020). "3rd Generation Partnership Project; Technical Specification Group Core Network and Terminals; Cx and Dx interfaces based on the Diameter protocol; Protocol details (Release 16)," Jun. 2020, 45 pages.

"What is Diameter Protocol", Retrieved from: https://ribboncommunications.com/company/get-help/glossary/diameter-protocol, Jan. 25, 2024, 4 pages.

* cited by examiner

PROXY-CALL SESSION CONTROL FUNCTION (P-CSCF)

BACKGROUND

A proxy-call session control function (P-CSCF) is a session initiation protocol (SIP) proxy that is the first point of contact for a user equipment (UE) in a mobile network. Different types of IMS traffic, such as fifth generation (5G) cellular, fourth generation (4G) cellular, short message service (SMS), WiFi, in-vehicle local area network (LAN), and rich communication services (RCS), are supported by P-CSCFs. For example, in order to make a voice or video call, a UE sends a SIP message (e.g., a SIP invite) to a P-CSCF, which forwards it to the IMS, in order to reach the called party.

A UE typically updates its registration with a P-CSCF on a predetermined interval, such as hourly (for example, a registration may expire after an hour) in order to balance UE battery drain and network traffic with the possibility of a UE being out of service. UE registration with a P-CSCF is described in cellular standards 3GPP TS 23.380 and ETSI TS 123 380. However, when a P-CSCF ceases operating properly (e.g., due to being overloaded, maintenance, or some other reason) UEs that had registered with that P-CSCF may remain unaware of the service outage until their next scheduled registration update. The delay between when a P-CSCF ceases operating properly and the UE's next scheduled registration update may negatively impact a UE's connectivity-dependent functionality, such as voice or video calls, thereby degrading user experience.

SUMMARY

The following summary is provided to illustrate examples disclosed herein, but is not meant to limit all examples to any particular configuration or sequence of operations.

Solutions for providing a data traffic session with proxy-call session control function (P-CSCF) restoration include: receiving an indication, by an application server (AS), that a user equipment (UE) is registered with a first proxy node; receiving, at a subscriber information node, from a call session control function (e.g., over an N70 interface), a first message triggering proxy node restoration; based on at least receiving the first message triggering proxy node restoration, transmitting, by the subscriber information node, to a management node, a second message triggering proxy node restoration; receiving an indication, by the AS, that the UE is registered with a second proxy node different than the first proxy node; and based on at least receiving a session initiation message, establishing the data traffic session for the UE with the second proxy node.

BRIEF DESCRIPTION OF THE DRAWINGS

The disclosed examples are described below with reference to the accompanying drawing figures listed below, wherein.

Corresponding reference characters indicate corresponding parts throughout the drawings. References made throughout this disclosure relating to specific examples, are provided for illustrative purposes, and are not meant to limit all implementations or to be interpreted as excluding the existence of additional implementations that also incorporate the recited features.

DETAILED DESCRIPTION

Solutions for providing a data traffic session with proxy-call session control function (P-CSCF) restoration include: receiving an indication, by an application server (AS), that a user equipment (UE) is registered with a first proxy node; receiving, at a subscriber information node, from a call session control function (e.g., over an N70 interface), a first message triggering proxy node restoration; based on at least receiving the first message triggering proxy node restoration, transmitting, by the subscriber information node, to a management node, a second message triggering proxy node restoration; receiving an indication, by the AS, that the UE is registered with a second proxy node different than the first proxy node; and based on at least receiving a session initiation message, establishing the data traffic session for the UE with the second proxy node.

Aspects of the disclosure improve the robustness, resilience, and reliability of wireless communications when transmitting, by a subscriber information node, to a management node, a message triggering proxy node restoration. The UE then locates and registers with a properly functioning proxy node. This results in the UE being registered with the properly functioning proxy node earlier than would occur if the UE instead waited until the lapse of its periodic proxy node registration. Upon re-registration, the UE is able to receive calls and other message traffic. Delays that would occur within the network used by the UE are thus mitigated.

Figure 1:
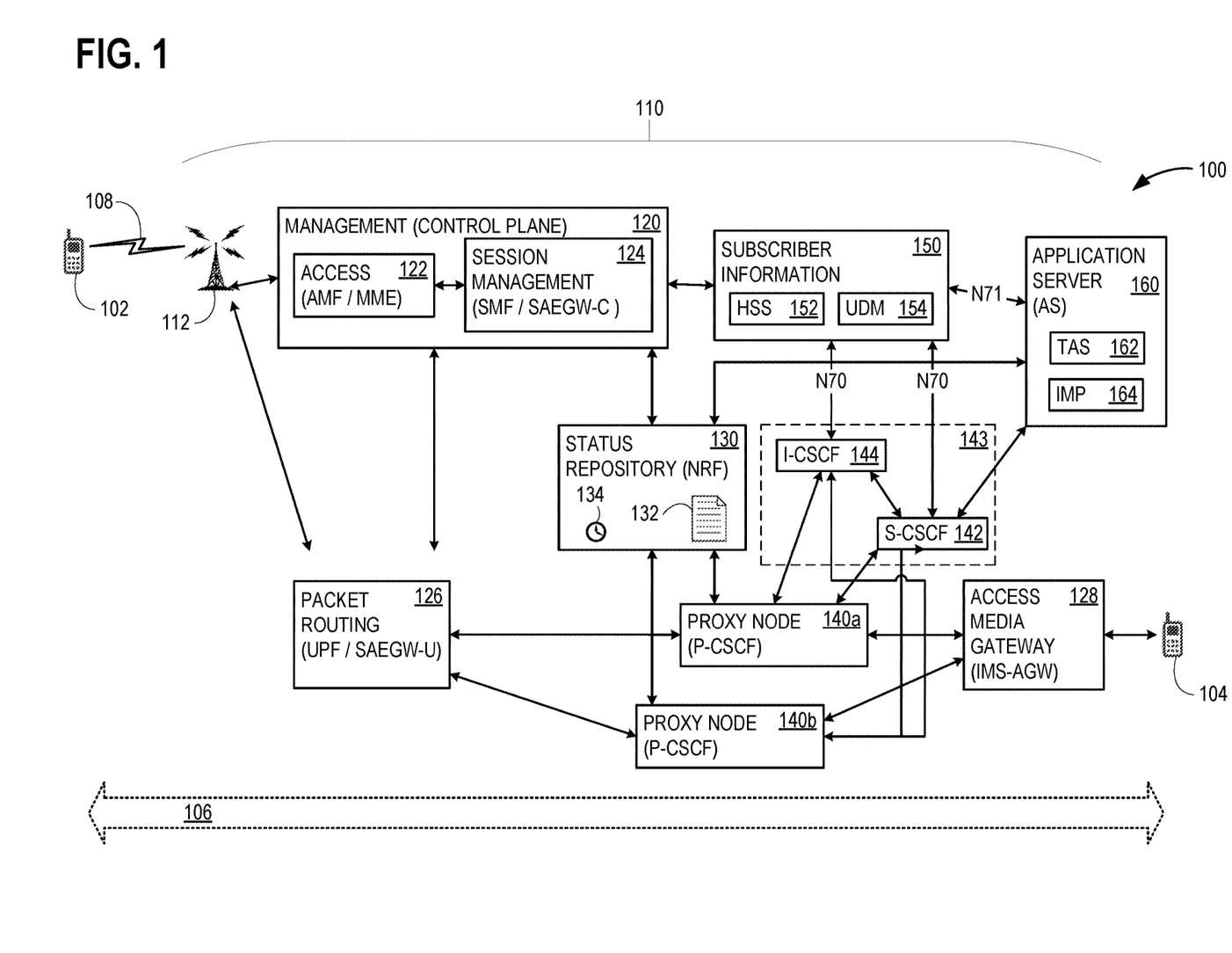
FIG. 1 illustrates an exemplary arrangement that advantageously performs proxy-call session control function (P-CSCF) restoration when providing a data traffic session.

FIG. 1 illustrates an exemplary arrangement 100 that advantageously performs P-CSCF restoration when establishing a data traffic session 106 for a UE 102 on a network 110. Data traffic session 106 may be, for example a video call or a voice call with a second UE 104, using a TAS 162, or an instant messaging (IM) session using an instant messaging platform (IMP) 164. TAS 162 and IMP 164 are examples of a general AS 160, although additional types of application servers may also be used. In some examples, UE 102 comprises an internet of things (IoT) device, such as a connected appliance, a smart home security system, an autonomous factory or farming machine, a wearable health monitor, a wireless inventory tracker, or another device, rather than merely a hand-held cellular telephone. In some examples, UE 102 sets up data traffic session 106 using session initiation protocol (SIP) signaling.

UE 102 registers with a network 110, which provides data traffic session 106. UE 102 communicates over an air interface 108 with a radio access network (RAN) 112 within network 110. Data traffic passes from RAN 112 through a packet routing node 126, a selected one of proxy nodes 140a and 140b, and an internet protocol (IP) messaging system (IMS) access gateway (IMS-AGW) 128 to reach second UE 104. Signaling for data traffic session 106 passes through a control plane portion of network 110 that includes an access node 122 and a session management node 124, which together are identified as a management node 120.

In some examples, proxy node 140a and proxy node 140b each comprises a P-CSCF. In fourth generation cellular (4G) examples, access node 122 may comprise a mobility management entity (MME), whereas in fifth generation cellular (5G) examples, access node 122 may comprise an access and mobility function (AMF). In 4G examples, session management node 124 may comprise a system architecture (SAE) evolution gateway-control plane (SAEGW-C). An SAEGW-C is the combination of a serving gateway (SGW)-control plane (SGW-C) and a packet data network gateway (PGW)-control plane (PGW-C). In 5G examples, session management node 124 may comprise a session management function (SMF). In 4G examples, packet routing node 126 may comprise an SAE evolution gateway-user plane (SAEGW-U). An SAEGW-U is the combination of an SGW-user plane (SGW-U) and a PGW-user plane (PGW-U). In 5G examples, packet routing node 126 may comprise a user plane function (UPF).

A status repository 130 may comprise a network repository function (NRF), which maintains a list 132 of registered network functions (e.g., proxy nodes 140a and 140b), their status (e.g., registered, suspended), and their subscriber information (e.g., identifying any of AS 160, TAS 162 and/or IMP 164). Status repository 130 also has a heartbeat timer 134. If status repository 130 does not receive a heartbeat message from a registered network function, such as proxy node 140a, by the lapse of timer 134, the status of that network function will change on list 132 to indicate that the non-responsive network function is unavailable (e.g., the status changes from registered to suspended). Status repository 130 is also in communication with management node 120.

A subscriber information node 150 includes a home subscriber server (HSS) 152 and, for 5G, a unified data management function (UDM) 154. Subscriber information node 150 is in communication with management node 120, and AS 160, which represents TAS 162 and/or IMP 164. Communication between subscriber information node 150 and AS 160 may use an N71 interface. Subscriber information node 150 is also in communication with proxy nodes 140a and 140b via an interrogating-CSCF (I-CSCF) 144 and a serving-CSCF (S-CSCF) 142. I-CSCF 144 and/or S-CSCF 142 are referenced herein generally as call session control function (CSCF) 143. In some examples, CSCF 143 communicates with subscriber information node 150 using an N70 interface. CSCF 143 is also in communication with AS 160. It should be understood that examples of network 110 may use different numbers of elements than shown. For example, a common core network may have six to ten pools of approximately a dozen or more P-CSCFs each.

Figure 2A:
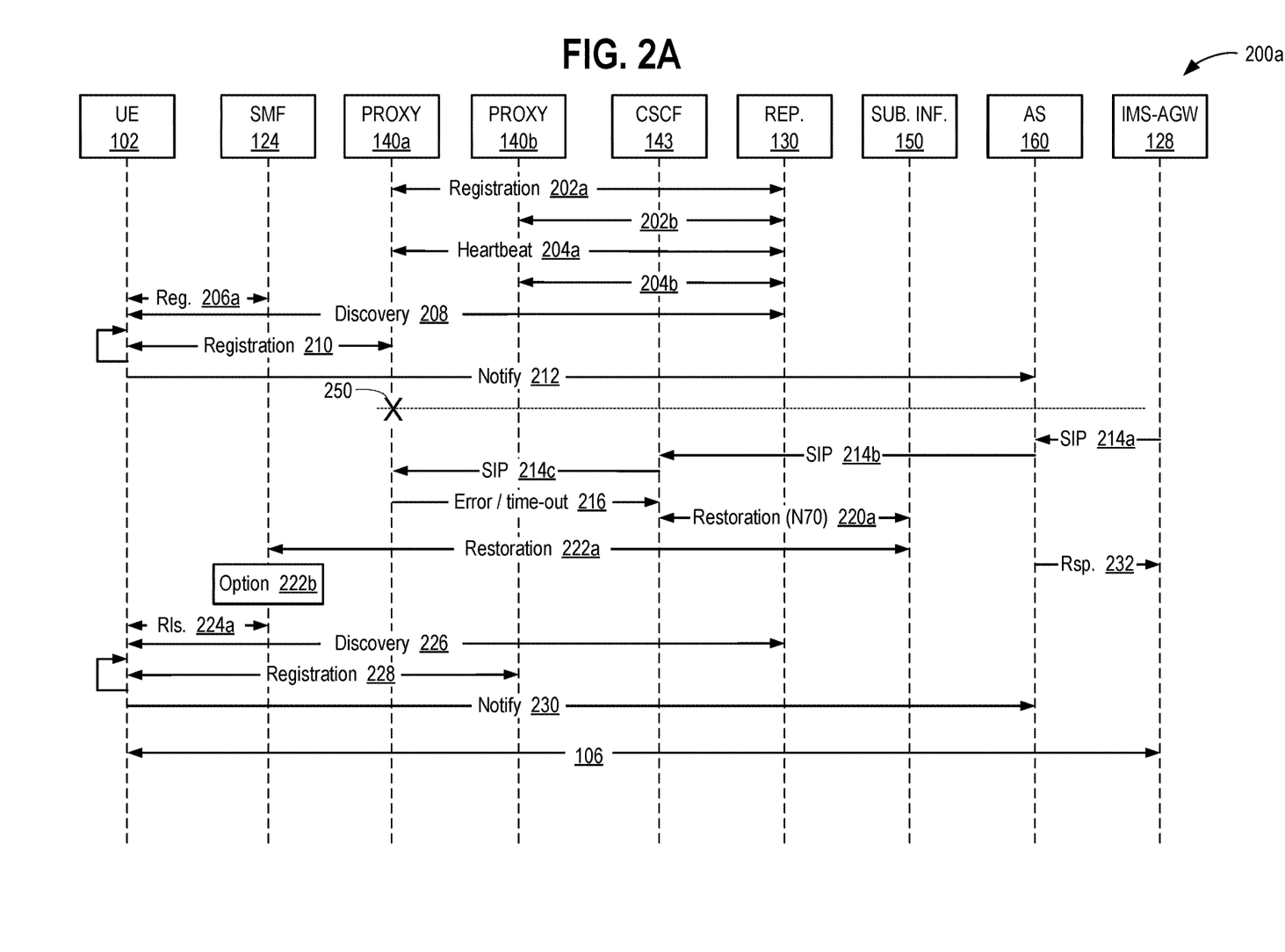
FIGS. 2A and 2B illustrate exemplary message sequence diagrams associated with examples of the arrangement of FIG. 1.

Operation of arrangement 100 is further described in relation to FIGS. 2A-4. FIG. 2A illustrates an exemplary message sequence diagram 200a associated with P-CSCF restoration by a 5G example version of arrangement 100, and FIG. 2B illustrates an exemplary message sequence diagram 200b associated with P-CSCF restoration by a 4G example version of arrangement 100. Each message indicated in message sequence diagrams 200a and 200b may represent a single one-way message, a message and a response, or a plurality of messages. Referring first to FIG. 2A, proxy node 140a comes on-line and registers with status repository 130 using message 202a, and status repository 130 monitors the status of proxy node 140a using ongoing heartbeat messages 204a. When proxy node 140b comes on-line, it similarly registers with status repository 130 using message 202b and is monitored by status repository 130 using ongoing heartbeat messages 204b.

UE 102 registers with network 110 using message 206a, shown going to session management node 124 (which is an SMF in 5G). UE 102 performs a proxy node discovery with status repository 130 using message 208. Upon discovering that proxy node 140a is in a registered status, UE 102 registers with proxy node 140a using message 210. UE 102 continues re-registering with proxy node 140a, for example hourly, according to when each registration event is scheduled to expire. AS 160 (representing TAS 162 and/or IMP 164) is notified that proxy node 140a is acting as a proxy for UE 102 using message 212. At failure event 250, proxy node 140a becomes non-responsive and ceases to send heartbeat messages 202a to status repository 130. Timer 134 lapses without status repository 130 receiving a heartbeat message 202a from proxy node 140a. In some examples, status repository 130 changes the status of proxy node 140a on list 132 to suspended.

AS 160 receives a session initiation message 214a (e.g., a SIP invite) from IMS-AGW 128 (or another network node), for example an incoming call notification. AS 160 forwards the session initiation message as session initiation message 214b to CSCF 143, which forwards it to proxy node 140a as session initiation message 214c. Because proxy node 140a is not operating properly, proxy node 140a either responds to CSCF 143 with an error message 216 or times out.

CSCF 143 transmits message 220a to subscriber information node 150 (shown as including both an HSS and a UDM), triggering proxy node restoration. In some examples, message 220a comprises a P-CSCF restoration indication. In some examples, message 220a uses an N71 interface. At some point, AS 160 responds to session initiation message 214a with a response message 232, although in some examples, message 232 may be delayed until UE 102 is registered with another proxy node and network 110 is able to set up data traffic session 106.

Subscriber information node 150 transmits message 222a to session management node 124 (and receives a response) further triggering proxy node restoration. When session management node 124 receives message 222a triggering proxy node restoration, multiple options 222b are available in 5G. These are described below in relation to box 326 and operation 328 of FIG. 3. In some examples, session management node 124 instructs UE 102 to release the packet data network (PDN) connection through proxy node 140a, using a PDN connection release message 224a. This triggers UE 102 to release that connection and perform another proxy node discovery with status repository 130 using message 226. Upon discovering that proxy node 140b is in a registered status, UE 102 registers with proxy node 140b using message 228. UE 102 continues re-registering with proxy node 140b, for example hourly, according to when each registration event is scheduled to expire. AS 160 is notified that proxy node 140b is acting as a proxy for UE 102 using message 230. Network 110 is able to establish data traffic session 106 for UE 102 with proxy node 140b.

Figure 2B:
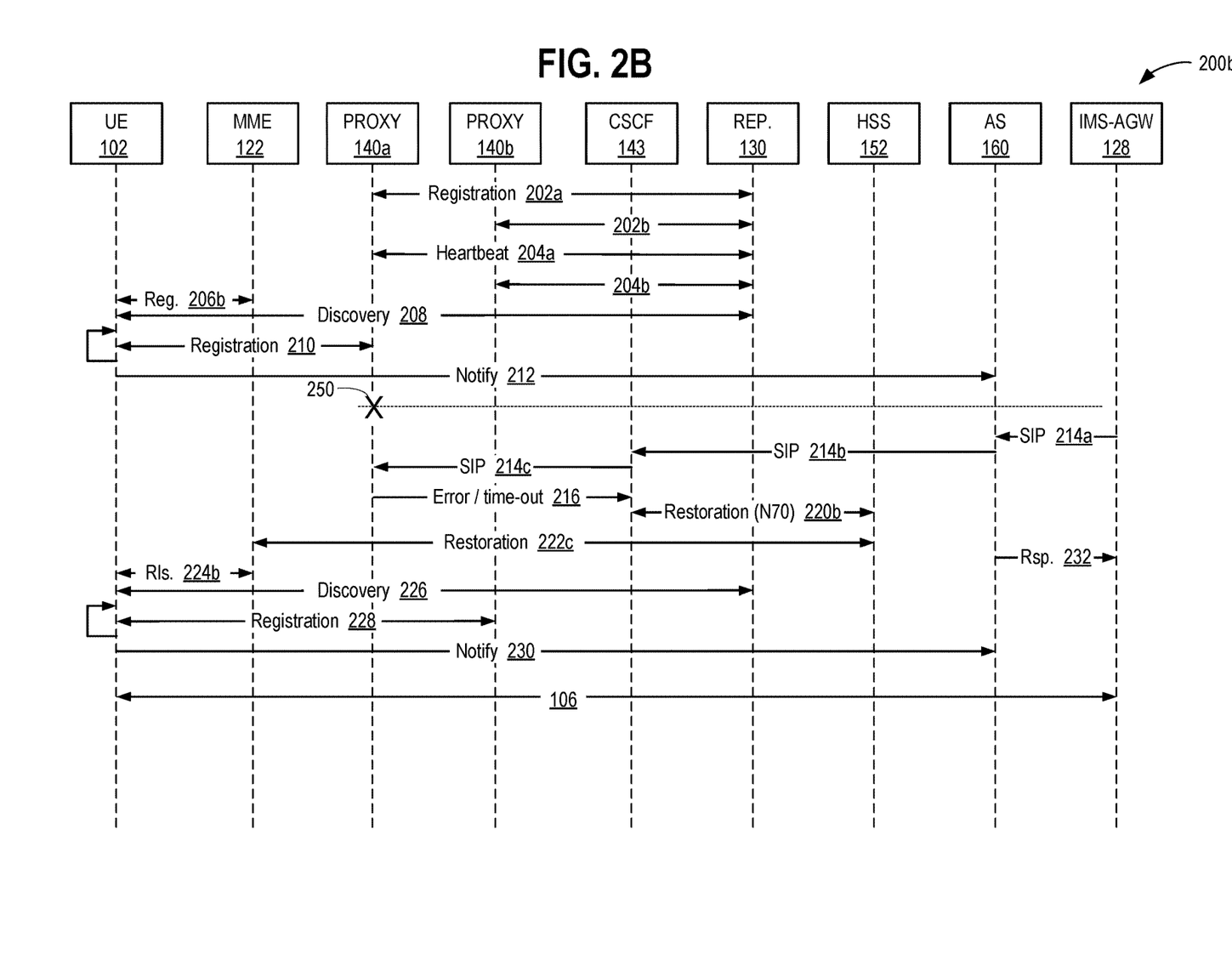

Referring now to FIG. 2B, message sequence diagram 200b is described based on differences from message sequence diagram 200a that are due to the 4G implementation of arrangement 100 supplanting 4G functionality. Management node 120 is represented by access node 122 (which is an MME in 4G), rather than session management node 124, and subscriber information node 150 is indicated as including only HSS 152. Registration message 206b between UE 102 and access node 122 replaces registration message 206a between UE 102 and session management node 124 (in message sequence diagram 200a). This is difference in representation, rather than function; registration of UE 102 with network 110 includes both access node 122 and session management node 124 in both 4G and 5G.

Message 220b and message 222c replace messages 220a and 222a, respectively due to the identified endpoint of HSS 152, rather than subscriber information node 150. However, the functionality of these messages remains similar. Message 224b replaces message 224a due to the identified endpoint difference of access node 122, rather than session management node 124. Other messages indicated in message sequence diagram 200b are similar to corresponding messages indicated in message sequence diagram 200a, apart from differences that may be due to 4G versus 5G message protocols.

Figure 3:
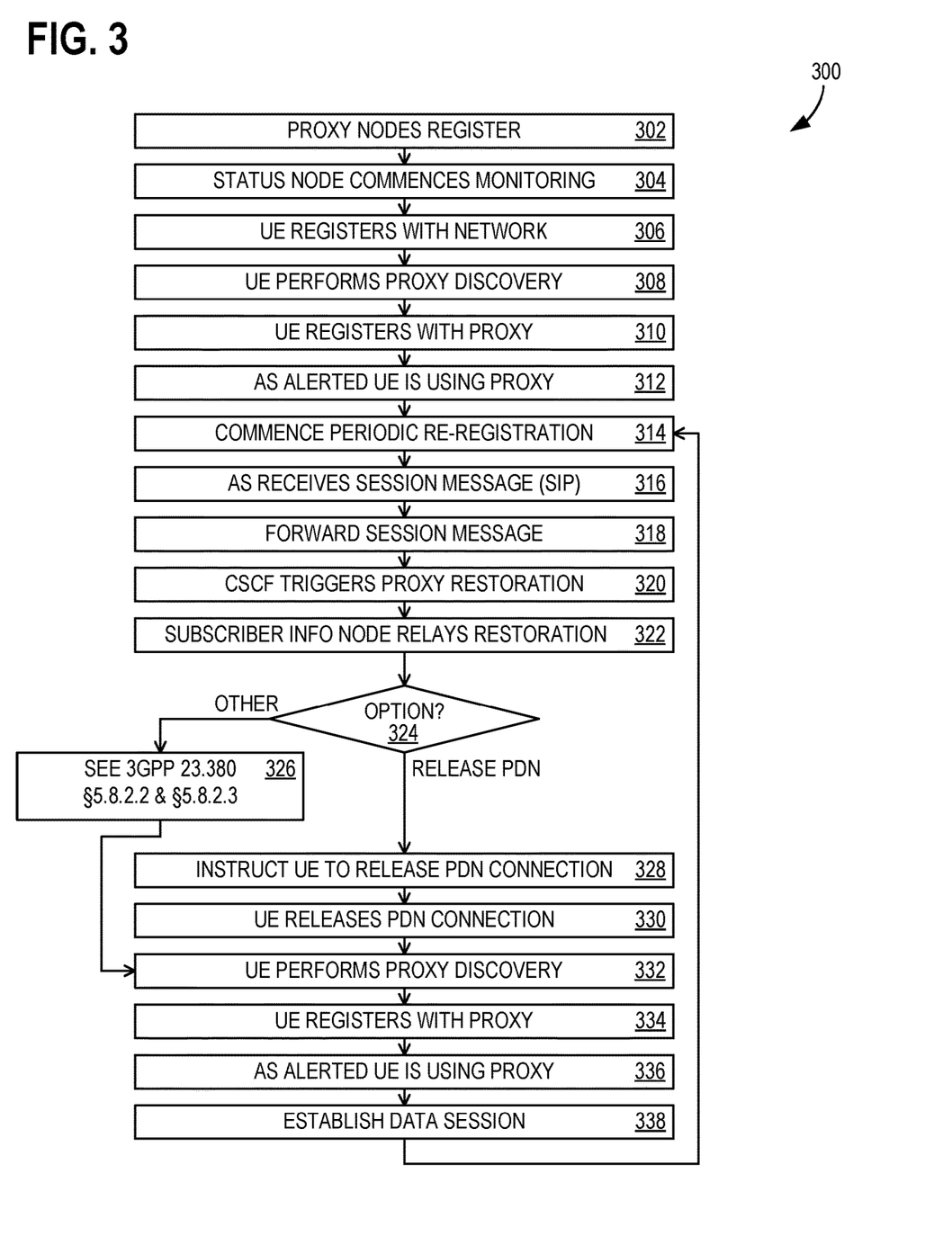
FIG. 3 illustrates a flowchart of exemplary operations associated with examples of the arrangement of FIG. 1.

FIG. 3 illustrates a flowchart 300 of exemplary operations associated with message sequence diagrams 200a and 200b, using examples of arrangement 100 to provide for P-CSCF restoration. In some examples, at least a portion of flowchart 300 may be performed using one or more computing devices 500 of FIG. 5. Proxy nodes 140a and 140b register with status repository 130 in operation 302. That is, operation 302 includes registering, by proxy node 140a, with status repository 130, and registering, by proxy node 140b, with status repository 130. In some examples, proxy node 140a comprises a P-CSCF and proxy node 140b, comprises a P-CSCF. In some examples, status repository 130 comprises an NRF.

Status repository 130 monitors heartbeat messages in operation 304, which includes monitoring, by status repository 130, the heartbeat message from proxy node 140a and monitoring, by status repository 130, the heartbeat message from proxy node 140b. UE 102 registers with network 110 in operation 306. Operation 308 includes performing, by UE 102, a proxy node discovery with status repository 130. Operation 310 includes registering, by UE 102, with proxy node 140a. Operation 312 includes receiving an indication, by AS 160, that UE 102 is registered with proxy node 140a. In some examples, AS 160 comprises a TAS, and in some examples, AS 160 comprises an IMP or another server type.

UE 102 begins periodic re-registration with the serving proxy node 140a in operation 314. For example, during a first pass through flowchart 300, operation 314 includes repeatedly, based on at least a timer, re-registering, by UE 102, with proxy node 140a. When flowchart 300 later returns to operation 314, operation 314 includes repeatedly, based on at least a timer, re-registering, by UE 102, with proxy node 140b (which will be the serving proxy node at that time).

Operation 316 includes receiving, by AS 160, a session initiation message (e.g., message 218). In some examples, the session initiation message comprises a SIP message (e.g., a SIP invite). In some examples, the session initiation message comprises a message session relay protocol (MSRP) message. Operation 318 includes, based on at least receiving the first session initiation message, forwarding, by AS 160, to CSCF 143 (e.g., S-CSCF 142 or I-CSCF 144), the session initiation message. Also, in operation 318, CSCF 143 forwards the session initiation message to proxy node 140a. However, because proxy node 140a is unavailable, proxy node 140a either returns an error message or fails to respond, so that CSCF 143 times-out.

CSCF 143 triggers proxy node restoration in operation 320. Operation 320 includes, based on at least receiving the indication that proxy node 140a is unavailable, transmitting, by CSCF 143, to subscriber information node 150, the first message triggering proxy node restoration (e.g., message 220a or 220b using an N70 interface). In some examples, the indication that proxy node 140a is unavailable comprises a time-out without a response from proxy node 140a. In some examples, the indication that proxy node 140a is unavailable comprises a message from proxy node 140a. In some examples, the first message triggering proxy node restoration comprises a P-CSCF restoration indication. Operation 320 also includes receiving, at subscriber information node 150, from CSCF 143, the first message triggering proxy node restoration. In some examples, the first message triggering proxy node restoration is received over an N70 interface. In some examples, subscriber information node 150 comprises an HSS and/or a UDM.

Operation 322 includes, based on at least receiving the first message triggering proxy node restoration, transmitting, by subscriber information node 150, to management node 120, a second message (e.g., message 222a) triggering proxy node restoration. In some examples, management node 120 comprises an SMF. In some examples, management node 120 comprises an MME. In some examples, the second message triggering proxy node restoration comprises a P-CSCF restoration indication.

In 5G, management node 120 (e.g., the SMF) selects an optional restoration action in decision operation 324. The options are indicated in cellular standards 3GPP TS 23.380 and ETSI TS 123 380, for example in section 5.8.2 Common Procedures for P-CSCF Restoration in SGC. Two of the options are indicated in box 326, and are specified in section 5.8.2.2 P-CSCF Address List Update Procedure and section 5.8.2.3 DHCP based P-CSCF Selection Triggering Procedure. The third option, in section 5.8.2.4 PDU Session Release with Reactivation Procedure, is performed in operation 328. Operation 328 may also be performed by 4G versions of arrangement 100, and includes, based on at least receiving the second message triggering proxy node restoration, transmitting, by management node 120, to UE 102, an instruction to release a PDN connection (e.g., releasing UE 102 from using proxy node 140a). In some examples, the instruction to release the PDN connection comprises an IMS PDN connection release message.

Operation 330 includes, based on at least receiving the instruction to release the PDN connection, releasing, by UE 102, a connection to proxy node 140a. Operation 332 includes performing, by UE 102, a proxy node discovery with status repository 130, and operation 334 includes registering, by UE 102, with proxy node 140b. In operation 336, AS 160 receives an indication that UE 102 is registered with proxy node 140b (a different proxy node than proxy node 140a). Operation 338 includes, based on at least receiving a session initiation message (e.g., message 218 or another similar message) establishing data traffic session 106 for UE 102 with proxy node 140b. Response message 232 (responding to message 214a) may be a part of operation 338 or may have occurred earlier. Flowchart 300 then returns to operation 314, although with UE 102 now performing on-going re-registration with proxy node 140b.

Figure 4:
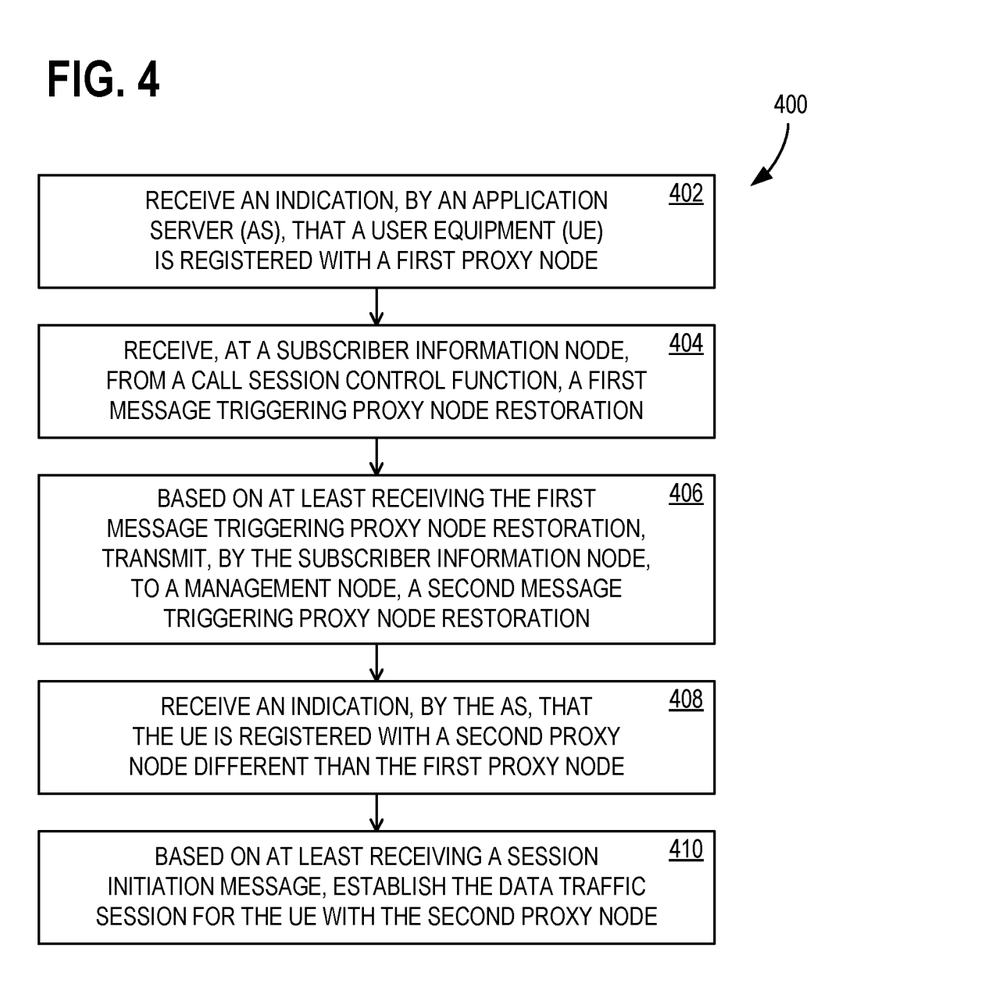
FIG. 4 illustrates another flowchart of exemplary operations associated with examples of the arrangement of FIG. 1.

FIG. 4 illustrates a flowchart 400 of exemplary operations associated with examples of arrangement 100. In some examples, at least a portion of flowchart 400 may each be performed using one or more computing devices 500 of FIG. 5. Operation 402 includes receiving an indication, by an AS, that a UE is registered with a first proxy node. Operation 404 includes receiving, at a subscriber information node, from a call session control function, a first message triggering proxy node restoration.

Operation 406 includes, based on at least receiving the first message triggering proxy node restoration, transmitting, by the subscriber information node, to a management node, a second message triggering proxy node restoration. Operation 408 includes receiving an indication, by the AS, that the UE is registered with a second proxy node different than the first proxy node. Operation 410 includes, based on at least receiving a session initiation message, establishing the data traffic session for the UE with the second proxy node.

Figure 5:
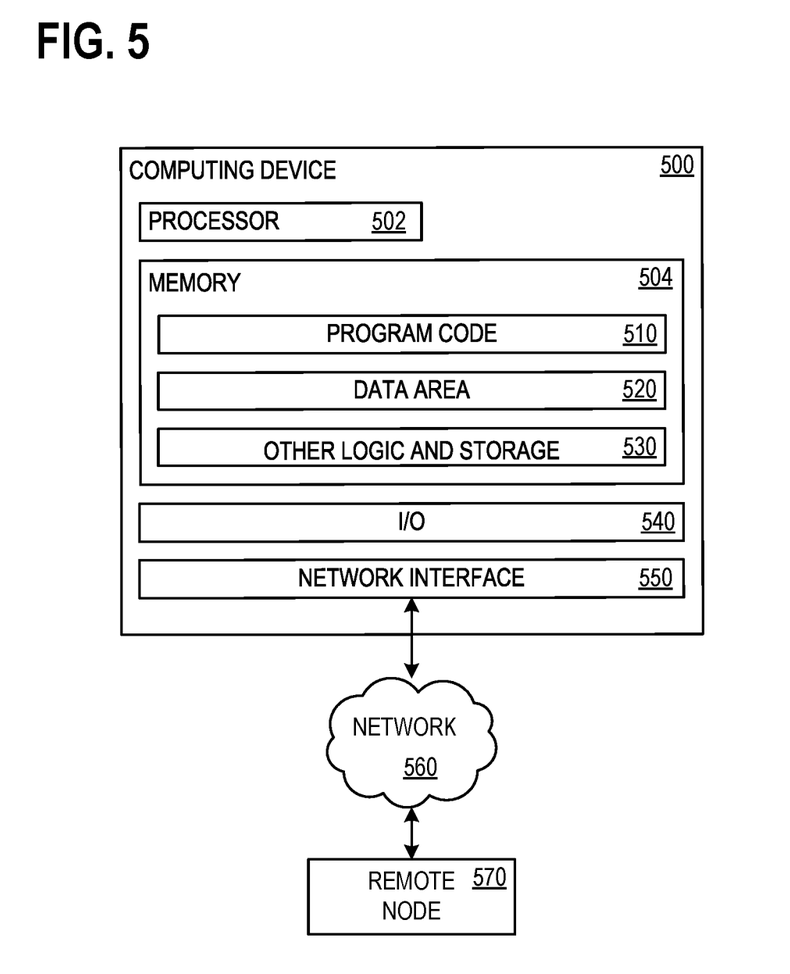
FIG. 5 illustrates a block diagram of a computing device suitable for implementing various aspects of the disclosure.

FIG. 5 illustrates a block diagram of computing device 500 that may be used as a component of arrangement 100, for example, as any component described herein that may require computational or storage capacity. Computing device 500 has at least a processor 502 and a memory 504 that holds program code 510, data area 520, and other logic and storage 530. Memory 504 is any device allowing information, such as computer executable instructions and/or other data, to be stored and retrieved. For example, memory 504 may include one or more random access memory (RAM) modules, flash memory modules, hard disks, solid-state disks, persistent memory devices, and/or optical disks. Program code 510 comprises computer executable instructions and computer executable components including any instructions necessary to perform operations described herein. Data area 520 holds any data necessary to perform operations described herein. Memory 504 also includes other logic and storage 530 that performs or facilitates other functions disclosed herein or otherwise required of computing device 500. An input/output (I/O) component 540 facilitates receiving input from users and other devices and generating displays for users and outputs for other devices. A network interface 550 permits communication over a network 560 with a remote node 570, which may represent another implementation of computing device 500.

ADDITIONAL EXAMPLES

An example method of providing a data traffic session comprises: receiving an indication, by an AS, that a UE is registered with a first proxy node; receiving, at a subscriber information node, from a call session control function, a first message triggering proxy node restoration; based on at least receiving the first message triggering proxy node restoration, transmitting, by the subscriber information node, to a management node, a second message triggering proxy node restoration; receiving an indication, by the AS, that the UE is registered with a second proxy node different than the first proxy node; and based on at least receiving a session initiation message, establishing the data traffic session for the UE with the second proxy node.

An example system for providing a data traffic session comprises: a processor; and a computer-readable medium storing instructions that are operative upon execution by the processor to: receive an indication, by an AS, that a UE is registered with a first proxy node; receive, at a subscriber information node, from a call session control function, a first message triggering proxy node restoration; based on at least receiving the first message triggering proxy node restoration, transmit, by the subscriber information node, to a management node, a second message triggering proxy node restoration; receive an indication, by the AS, that the UE is registered with a second proxy node different than the first proxy node; and based on at least receiving a session initiation message, establish the data traffic session for the UE with the second proxy node.

One or more example computer storage devices has computer-executable instructions stored thereon, which, upon execution by a computer, cause the computer to perform operations comprising: receiving an indication, by an AS, that a UE is registered with a first proxy node; receiving, at a subscriber information node, from a call session control function, a first message triggering proxy node restoration; based on at least receiving the first message triggering proxy node restoration, transmitting, by the subscriber information node, to a management node, a second message triggering proxy node restoration; receiving an indication, by the AS, that the UE is registered with a second proxy node different than the first proxy node; and based on at least receiving a session initiation message, establishing a data traffic session for the UE with the second proxy node.

Alternatively, or in addition to the other examples described herein, examples include any combination of the following:
- the first message triggering proxy node restoration is received over an N70 interface;
- the AS comprises a TAS;
- based on at least receiving an indication that the first proxy node is unavailable, transmitting, by the call session control function, to the subscriber information node, the first message triggering proxy node restoration;
- the indication that the first proxy node is unavailable comprises a time-out without a response from the first proxy node;
- the indication that the first proxy node is unavailable comprises a message from the first proxy node;
- based on at least receiving the second message triggering proxy node restoration, transmitting, by the management node, to the UE, an instruction to release a PDN connection;
- based on at least receiving the instruction to release the PDN connection: releasing, by the UE, a connection to the first proxy node; performing, by the UE, a proxy node discovery with a status repository; and registering, by the UE, with the second proxy node;
- the first proxy node comprises a P-CSCF;
- the second proxy node comprises a P-CSCF;
- the call session control function comprises an S-CSCF;
- the subscriber information node comprises an HSS;
- the subscriber information node comprises a UDM;
- the management node comprises an SMF;
- the management node comprises an MME;
- the first message triggering proxy node restoration comprises a P-CSCF restoration indication;
- the second message triggering proxy node restoration comprises a P-CSCF restoration indication;
- the session initiation message comprises a SIP message;
- the status repository comprises an NRF;
- receiving, by the AS, the session initiation message;
- responding, by the AS, to the session initiation message; and
- based on at least receiving the first session initiation message, forwarding, by the AS, to the call session control function, the session initiation message.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of".

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of providing a data traffic session, the method comprising:
   receiving, by a unified data management function (UDM), a proxy-call session control function (P-CSCF) restoration indication over a single N70 interface extending directly between the UDM and a serving-call session control function (S-CSCF);
   based on at least receiving the SIP message, transmitting, by the UDM, the P-CSCF restoration indication to a session management function (SMF) responsive to receiving the P-CSCF restoration indication over the single N70 interface;
   based on at least receiving the P-CSCF restoration indication, sending, from the SMF to a user equipment (UE), an internet protocol (IP) messaging system (IMS) Packet Data Network (PDN) connection release message instructing the UE to release registration with a first P-CSCF and re-register with a second P-CSCF that is different than the first P-CSCF;
   receiving an indication, by an application server (AS), that the UE is registered with the second P-CSCF; and
   based on at least receiving a session initiation message, establishing the data traffic session for the UE with the second P-CSCF.

2. The method of claim 1, wherein the AS comprises a telephony application server (TAS).

3. The method of claim 1, further comprising:
   based on at least receiving an indication that the first P-CSCF is unavailable, transmitting, by the S-CSCF, the P-CSCF restoration indication over the single N70 interface to the UDM.

4. The method of claim 3, wherein the indication that the first P-CSCF is unavailable comprises a time-out without a response from the first P-CSCF.

5. The method of claim 3, wherein the indication that the first P-CSCF is unavailable comprises a message from the first P-CSCF.

6. The method of claim 1, further comprising:
   releasing, by the UE, a connection to the first P-CSCF;
   performing, by the UE, a proxy node discovery with a status repository; and
   registering, by the UE, with the second P-CSCF.

7. The method of claim 6, wherein the status repository comprises a network repository function (NRF).

8. A system comprising:
   processor(s); and
   computer-readable medium storing programming instructions that, when executed by the processor(s), cause the processor(s) to:
   receive, by a unified data management function (UDM), a proxy-call session control function (P-CSCF) restoration indication over a single N70 interface extending directly between the UDM and a serving-call session control function (S-CSCF);
   transmit, by the UDM, the P-CSCF restoration indication to a session management function (SMF) responsive to receiving the P-CSCF restoration indication over the single N70 interface;
   based on at least receiving the P-CSCF restoration indication, send, from the SMF to a user equipment (UE), an internet protocol (IP) messaging system (IMS) Packet Data Network (PDN) connection release message instructing the UE to release registration with a first P-CSCF and re-register with a second P-CSCF that is different than the first P-CSCF;
   receive an indication, by an application server (AS), that the UE is registered with the second P-CSCF; and
   based on at least receiving a session initiation message, establish a data traffic session for the UE with the second P-CSCF.

9. The system of claim 8, wherein the AS comprises a telephony application server (TAS).

10. The system of claim 8, wherein the programming instructions for cause the processor(s) to transmit by the S-CSCF, P-CSCF restoration indication over the single N70 interface to the UDM based at least on receiving an indication that the first P-CSCF is unavailable.

11. The system of claim 10, wherein the indication that the first P-CSCF is unavailable comprises a time-out without a response from the first P-CSCF.

12. The system of claim 10, wherein the indication that the first P-CSCF is unavailable comprises a message from the first P-CSCF.

13. The system of claim 10, wherein the programming instructions further cause the processor(s) to:
   release, by the UE, a connection to the first P-CSCF;
   perform, by the UE, a proxy node discovery with a status repository; and
   register, by the UE, with the second P-CSCF.

14. The system of claim 13, wherein the status repository comprises a network repository function (NRF).

15. A method of providing a data traffic session, the method comprising:
   receiving, by a unified data management function (UDM), a proxy-call session control function (P-CSCF) restoration indication over a single N70 interface extending directly between the UDM and a serving-call session control function (S-CSCF); and
   transmitting, by the UDM, the P-CSCF restoration indication to a session management function (SMF) responsive to receiving the P-CSCF restoration indication over the single N70 interface, wherein the P-CSCF restoration indication prompts the SMF to send an internet protocol (IP) messaging system (IMS) Packet Data Network (PDN) connection release message instructing a user equipment (UE) to release registration with a first P-CSCF, to re-register with a second P-CSCF that is different than the first P-CSCF, and to notify an application server (AS) that the UE is registered with the second P-CSCF, and wherein notifying the AS that the UE is registered with the second P-CSCF triggers establishment of the data traffic session for the UE with the second P-CSCF.

16. The method of claim 15, wherein the AS comprises a telephony application server (TAS).

17. The method of claim 15, wherein the S-CSCF transmits the P-CSCF restoration indication over the single N70 interface in response to receiving an indication that the first P-CSCF is unavailable.

18. The method of claim 15, wherein the indication that the first P-CSCF is unavailable comprises a time-out without a response from the first P-CSCF.

19. The method of claim 15, wherein the indication that the first P-CSCF is unavailable comprises a message from the first P-CSCF.

* * * * *